United States Patent
Gottschlag et al.

(10) Patent No.: US 10,257,467 B2
(45) Date of Patent: Apr. 9, 2019

(54) CLIENT DEVICE FOR DISPLAYING IMAGES OF A CONTROLLABLE CAMERA, METHOD, COMPUTER PROGRAM AND MONITORING SYSTEM COMPRISING SAID CLIENT DEVICE

(71) Applicant: Robert Bosch GmbH, Stuttgart (DE)

(72) Inventors: Daniel Gottschlag, Nuremberg (DE); Stephan Heigl, Hannover (DE)

(73) Assignee: Robert Bosch GmbH, Stuttgart (DE)

(*) Notice: Subject to any disclaimer, the term of this patent is extended or adjusted under 35 U.S.C. 154(b) by 299 days.

(21) Appl. No.: 14/429,027

(22) PCT Filed: Sep. 17, 2013

(86) PCT No.: PCT/EP2013/069237
§ 371 (c)(1),
(2) Date: Mar. 18, 2015

(87) PCT Pub. No.: WO2014/044661
PCT Pub. Date: Mar. 27, 2014

(65) Prior Publication Data
US 2015/0222860 A1    Aug. 6, 2015

(30) Foreign Application Priority Data
Sep. 24, 2012    (DE) .................. 10 2012 217 148

(51) Int. Cl.
*G06F 3/041* (2006.01)
*G06F 3/048* (2013.01)
(Continued)

(52) U.S. Cl.
CPC ......... *H04N 7/181* (2013.01); *G06F 3/04883* (2013.01); *G06K 9/00201* (2013.01);
(Continued)

(58) Field of Classification Search
None
See application file for complete search history.

(56) References Cited

U.S. PATENT DOCUMENTS 8,049,658 B1* 11/2011 Lagonik ............... G01C 21/005
342/118
2005/0275721 A1* 12/2005 Ishii ................. G08B 13/19608
348/159

(Continued)

FOREIGN PATENT DOCUMENTS

CN    102214065 A    10/2011
DE    10222203       12/2003

(Continued)

OTHER PUBLICATIONS

International Search Report for Application No. PCT/EP2013/069237 dated Dec. 11, 2013 (English Translation, 2 pages).

*Primary Examiner* — Alison Slater
(74) *Attorney, Agent, or Firm* — Michael Best & Friedrich LLP

(57) ABSTRACT

Embodiments provide to a client device for displaying camera images of a controllable camera. The client device includes a screen and a display device for displaying a first image representation on the screen. The first image representation shows an actual camera image in an actual visual range of the camera. The client device also includes a selection device designed to select a desired visual range of the camera, and has a communications device designed to request and receive a desired camera image in the desired camera visual range. The display device is designed to display, in a second image representation, at least some portion of the actual camera image correctly in terms of position and size in the desired camera visual range and, in (Continued)

an additional image representation, to display the desired camera image correctly in terms of position and size in the desired camera visual range.

18 Claims, 6 Drawing Sheets

(51) Int. Cl.
    *G06F 3/0484* (2013.01)
    *G06F 3/0488* (2013.01)
    *H04N 7/18* (2006.01)
    *H04N 5/232* (2006.01)
    *G08B 13/196* (2006.01)
    *G06K 9/00* (2006.01)
    *G06K 9/62* (2006.01)
    *H04N 5/262* (2006.01)
    *G06K 9/68* (2006.01)

(52) U.S. Cl.
    CPC ....... *G06K 9/6255* (2013.01); *G08B 13/1963* (2013.01); *G08B 13/19682* (2013.01); *H04N 5/232* (2013.01); *H04N 5/23203* (2013.01); *H04N 5/23206* (2013.01); *H04N 5/23216* (2013.01); *H04N 5/23222* (2013.01); *H04N 5/2628* (2013.01); *G06F 2203/04806* (2013.01); *G06K 2009/6864* (2013.01); *G06K 2209/21* (2013.01); *H04N 7/18* (2013.01)

(56) References Cited

U.S. PATENT DOCUMENTS

| | | | | |
|---|---|---|---|---|
| 2008/0123897 | A1* | 5/2008 | Cho | G06F 3/0481 382/100 |
| 2010/0070912 | A1* | 3/2010 | Zaman | G06F 3/0481 715/784 |
| 2010/0097444 | A1* | 4/2010 | Lablans | G03B 35/00 348/46 |
| 2010/0118160 | A1* | 5/2010 | Tsurumi | G06T 3/0087 348/231.2 |
| 2010/0266161 | A1* | 10/2010 | Kmiecik | G01C 21/26 382/103 |
| 2011/0085016 | A1 | 4/2011 | Kristiansen et al. | |
| 2012/0127319 | A1 | 5/2012 | Rao et al. | |
| 2014/0022433 | A1* | 1/2014 | Glennie | H04N 5/23212 348/333.02 |
| 2015/0248220 | A1* | 9/2015 | Gottschlag | G06F 3/0488 715/716 |

FOREIGN PATENT DOCUMENTS

| | | |
|---|---|---|
| DE | 102004040023 | 3/2006 |
| WO | 2011046448 | 4/2011 |

* cited by examiner

PRIOR ART  Fig. 5

CLIENT DEVICE FOR DISPLAYING IMAGES OF A CONTROLLABLE CAMERA, METHOD, COMPUTER PROGRAM AND MONITORING SYSTEM COMPRISING SAID CLIENT DEVICE

BACKGROUND OF THE INVENTION

The invention relates to a client device for displaying camera images of a controllable camera, said client device having a screen, a display device for displaying a first image representation, said first image representation showing an actual camera image in an actual visual range of the camera. The client device also has a selection device which is designed to select a desired visual range of the camera, and has a communications device which is designed to request and receive a desired camera image in the desired camera visual range. The invention also relates to a method comprising the client device, a computer program for the client device as well as a monitoring system comprising the client device.

Camera-based monitoring systems are used for securing buildings or open public spaces. Such monitoring systems often have at least one monitoring camera which can be in the form of a fixed monitoring camera. However, PTZ cameras (Pan-Tilt-Zoom cameras) are also known which can be controlled by means of a servomotor with regard to the swivel angle, the angle of inclination and a magnification setting.

Such PTZ cameras are not only known in the field of monitoring systems. Hence, the WIPO patent publication WO 2011/046448 A1, which arguably represents the closest prior art, discloses a PTZ camera for a conference system. In the publication, the problem is discussed with regard to the fact that the request for setting the PTZ camera can be different for each conference, so that the PTZ camera has to be interactively controlled in order to accordingly be able to adapt the field of vision of the PTZ camera to the respective requests. In a possible embodiment, a touchscreen is provided, wherein the control commands for the PTZ camera are inputted via the touchscreen.

SUMMARY OF THE INVENTION

The invention relates to a client device for displaying camera images of a controllable camera. The client device can be in the form of a computer workstation, in particular in the form of a personal computer (PC). As an alternative thereto, the client device can however also be implemented as a mobile terminal, in particular as a laptop, smartphone or tablet.

The client device comprises a screen as well as a display device which is designed to actuate the screen. The display device can, for example, be designed as a data processing device, in particular as a digital data processing device. The screen is preferably an integral component of the client device. The display device is designed to display a first image representation on the screen, said first image representation being defined as the items of image information displayed on the screen. The first image representation is an actual camera image in an actual visual range of the camera. The actual camera image is preferably a current camera image of the controllable camera. The actual camera visual range is preferably defined by an orientation, a magnification and/or a viewing angle of the controllable camera.

The client device comprises a selection device, which, in particular, is designed as a human-machine interface, said selection device being designed to select a desired visual range of controllable camera. The desired visual range of the camera is achieved by means of an altered orientation and/or an altered magnification or, respectively, an altered viewing angle of the camera.

In addition, the client device comprises a communications device which is designed to request and receive a desired camera image in the desired camera visual range. Whereas the actual camera image is the camera image which is captured by the camera in the actual visual range of the camera, the desired camera image is the camera image that is captured by the camera in the desired camera visual range.

It is further proposed within the scope of the invention that the display device is designed to display, in a second image representation, at least some portion of the actual camera image correctly in terms of position and size in the desired camera visual range and, in an additional image representation, to display the desired camera image correctly in terms of position and size in the desired camera visual range.

After or when selecting the desired camera visual range, the client device switches the screen thereof into a second or additional image representation, wherein camera images or portions thereof of the desired camera visual range are displayed. These camera images are however, in fact, not or not completely present on the client device because the camera first has to orient itself accordingly or has to change the viewing angle/the magnification thereof. In this case, the actual camera image is displayed correctly in terms of position and size in the desired camera visual range. The actual camera image is thus displaced and/or scaled, i.e. magnified or reduced, on the screen in such a manner that at least portions of the actual camera image are displayed correctly in terms of position and size in the desired camera visual range now to be displayed. The remaining surface of the desired camera visual range can, for example, remain empty or be displayed in a covering color.

At a later point in time, the desired camera image is delivered via the communications device, said desired camera image filling the desired camera visual range to one hundred percent in the ideal case. In an additional image representation, the desired camera image is therefore displayed correctly in terms of position and size in the desired camera visual range. During the transition from the second image representation to the additional image representation, stationary, substantively identical image regions of the actual camera image and the desired camera image congruently overlap on the screen.

The advantage of the client device is particularly apparent by the fact that said device reacts very quickly to a selection with the selection device. Hence, an integration of the actual camera image into the desired camera visual range can be performed automatically by the client device without having to request and wait for further data from the controllable camera. Hence, the response time of the client device to generate the second image representation depends solely upon the computing power of said client device itself Due to the fact that the computing capacities of mobile terminals or other data processing devices are now very high, the second image representation can be performed almost or completely without delay in the perception of the user.

In contrast, a certain temporal delay or latency usually occurs as a result of requesting and receiving the desired camera image. This temporal delay particularly occurs because the controllable camera has to first adjust itself such that said camera takes up the desired camera visual range. For this reason, the additional image representation comprising the desired camera image first occurs at a later point in time. Nevertheless, the interactive process of the client device produces a direct link between the action of the operator via the selection device and the display via the display device and additionally a direct link for controlling the controllable camera and thus facilitates a very intuitive, exact and comfortable operation as well as actuation of the controllable camera.

Provision is made in a preferred modification to the invention for the display device to be designed to display, in at least one intermediate image representation upstream of the additional image representation, an intermediate camera image in an intermediate camera visual range correctly in terms of position and size in the desired camera visual range. This modification is based on the consideration that, when requesting the desired camera image in the desired camera visual range, the camera has to first be motorically moved. Depending on the actuator of the controllable camera, this process can take up a certain amount of time, wherein one or a plurality of camera images is captured during this period of time. These intermediate camera images are however not discarded but displayed by the display device on the screen, however once again only the partial sections of the intermediate camera images which can be displayed correctly in terms of position and size in the desired camera visual range. In this modification, the image representation on the screen is therefore continually updated; thus enabling camera images that are always current to be displayed. The desired camera visual range on the screen is in the majority of cases, starting from the actual image via one or a plurality of intermediate camera images, continuously further filled, and in fact always with current camera images; thus enabling the maximum available image information in the selected desired camera visual range to be displayed to the user.

In a preferred embodiment of the invention, the selection device is designed to implement the selection of the desired camera visual range by interactively moving a selected pixel of the actual camera image. In a first step, a pixel (or an image region comprising the pixel) of the actual camera image is thus defined by means of the selection device. In a second step, the selected pixel of the actual camera image is displaced. Provision is thereby made for the selection device to be designed such that the actual camera image is displaced jointly with the selected pixel. It is thereby ensured that at least some portion of the actual camera image is displayed in the desired camera visual range. The selected pixel can, for example, be selected and interactively displaced using a computer mouse or by operating a touchscreen. When interactively moving the selected pixel as well as the actual camera image, a transition is thus created from the first image representation to the second image representation. It is optionally possible for the actual camera image to be replaced by a succeeding intermediate camera image or even by a desired camera image already during the displacement of said selected pixel as well as said actual camera image. The replacement however takes place in such a manner that the currently displayed camera image is always disposed correctly in terms of position and size with respect to the current desired camera visual range and/or that the selected pixel is disposed at the position selected by the selection device.

In a modification or an alternative of the invention, the selection device is designed to select the desired camera visual range by interactively moving two selected pixels of the active camera image. In this way, the actual camera image is scaled as a function of the position of the two selected pixels in order to display at least some portion of the actual camera image in the desired camera visual range. By means of the so-called "pinching", a zooming of the view is, for example implemented on smart phones. A transition from an actual camera visual range to a desired camera visual range likewise occurs when zooming, said transition—insofar that it relates to a symmetrical zooming—being implemented solely by means of a change in the viewing angle. When zooming, which likewise entails the interactive displacement of two selected pixels, the viewing angle as well as the orientation of the camera is changed in order to be able to produce a corresponding desired camera image.

It is also preferred in this change from the actual camera visual range to the desired camera visual range that the pixels selected by the selection device are disposed in the desired camera visual range at the positions selected by the selection device. It is thereby ensured that the user can always interactively operate the client device in a simple manner.

In a preferred implementation of the invention, the communications device is designed to receive the actual camera image, the intermediate camera image and the desired camera image as camera images together in each case with metadata, wherein the metadata facilitate an integration of the camera images into a common reference system. This implementation is based on the consideration that the selection of the desired camera visual range as well as the integration of the camera images into the desired camera visual range is dramatically simplified by the provision of metadata and the use of a common reference system. The metadata are particularly in the form of position specifications in the reference system and/or as setting parameters, in particular swivel angles, angles of inclination and viewing angles of the controllable camera.

In a possible embodiment of the invention, the reference system is designed as a flat 2D reference system. Two opposite corner coordinates of the camera images can, for example, be transmitted as metadata in the 2D reference system. In this embodiment, all possible camera visual ranges are therefore projected onto a two dimensional surface and the respectively current camera images are provided with the corresponding coordinates.

In a preferred embodiment of the invention, a 3D reference system or a polar coordinate system is however used, wherein the metadata comprise the actual pan values, the actual tilt values and the actual zoom values of the camera or values, respectively definitions, equivalent thereto. A spherical coordinate system can particularly be used which is limited to the angle specifications.

A further subject matter of the invention relates to a method for displaying camera images of a controllable camera on a screen. According to the method, an actual camera image is displayed, in a first image representation, in an actual camera visual range on the screen. In a succeeding step, a desired camera visual range is selected; and subsequently in a second image representation, at least some portion of the actual camera image is displayed correctly in terms of position and size in the desired camera visual range and, in an additional image representation, the desired camera image of the desired camera range is displayed correctly in terms of position and size in the desired camera visual range.

A further subject matter of the invention relates to a computer program comprising program code means.

A further subject matter of the invention relates to a monitoring system which has a client device, as said device was previously described or, respectively. In addition, the monitoring system comprises at least one controllable camera, as said camera was previously described.

BRIEF DESCRIPTION OF THE DRAWINGS

Further features, advantages and effects of the invention ensue from the following description of a preferred exemplary embodiment of the invention as well as from the attached drawings. In the drawings.

DETAILED DESCRIPTION

Figure 1:
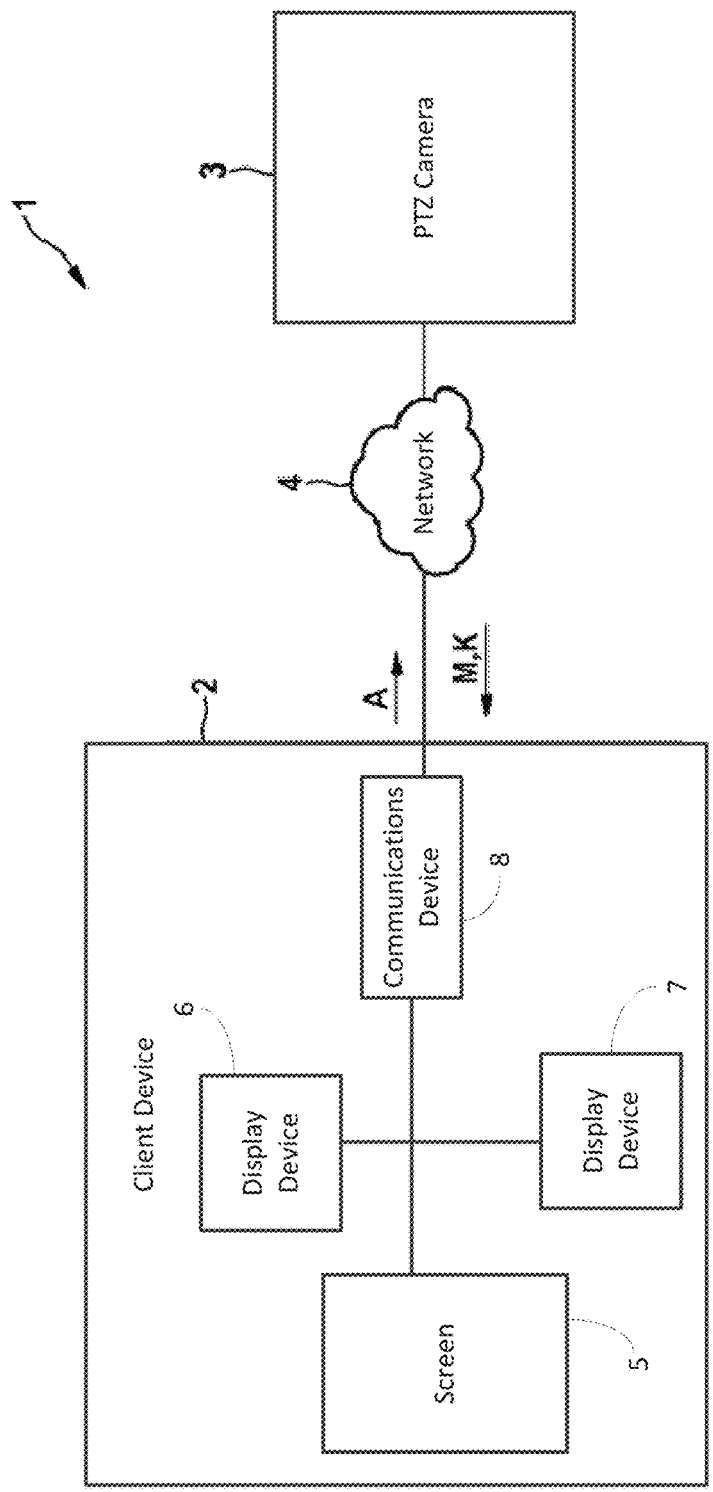
FIG. 1 shows a schematic block diagram of a monitoring system comprising a client device as an exemplary embodiment of the invention.

FIG. 1 shows a monitoring system 1 in a schematic block diagram, which can be designed to monitor any monitoring area. Said monitoring system can also relate to a monitoring of a conference. The monitoring system 1 is however particularly intended to monitor monitoring areas against unauthorized entry, theft, in particular shoplifting etc.

The monitoring system 1 comprises one or a plurality of client devices 2 and one or a plurality of PTZ cameras (Pan-Tilt-Zoom cameras) 3 as controllable cameras. The PTZ camera 3 is connected to the client device 2 via a network 4. The network 4 can also relate to a cable connected network, such as a LAN. It is however also possible for the network 4 to be designed as a public network, in particular as an internet system.

The PTZ camera 3 has an actuator which allows said PTZ camera 3 to swivel (pan) about an axis perpendicular to an installation, base or reference surface and to tilt about an axis which is parallel to said surface and which is oriented perpendicularly to a viewing direction of the PTZ camera 3. In addition, the PTZ camera 3 comprises a motorically driven zoom. In other exemplary embodiments, a PT camera can also be provided instead of the PTZ camera 3, i.e. without the zoom operation mode, or a monitoring camera having electronic zoom.

The client device 2 can be designed as a personal computer, said device is however preferably in the form of a mobile terminal device, in particular in the form of a smartphone or tablet PC. In a particularly preferred manner, the connection from the client device to the network 4 is implemented without cables.

The client device 2 has a screen 5 for displaying camera images of the PTZ camera. The screen 5 is actuated by a display device 6, wherein the display device 6 can at the same time constitute the control device of the client device 2. The client device 2 further comprises a selection device 7 which forms a human-machine interface to said client device 2 and is designed, for example, as a touch sensitive field on the screen 5; thus enabling said touch sensitive field to be implemented as a touchscreen. In addition, the client device 2 has a communications device 8 which is designed to communicate via a network 4 with the PTZ camera.

Figure 2:
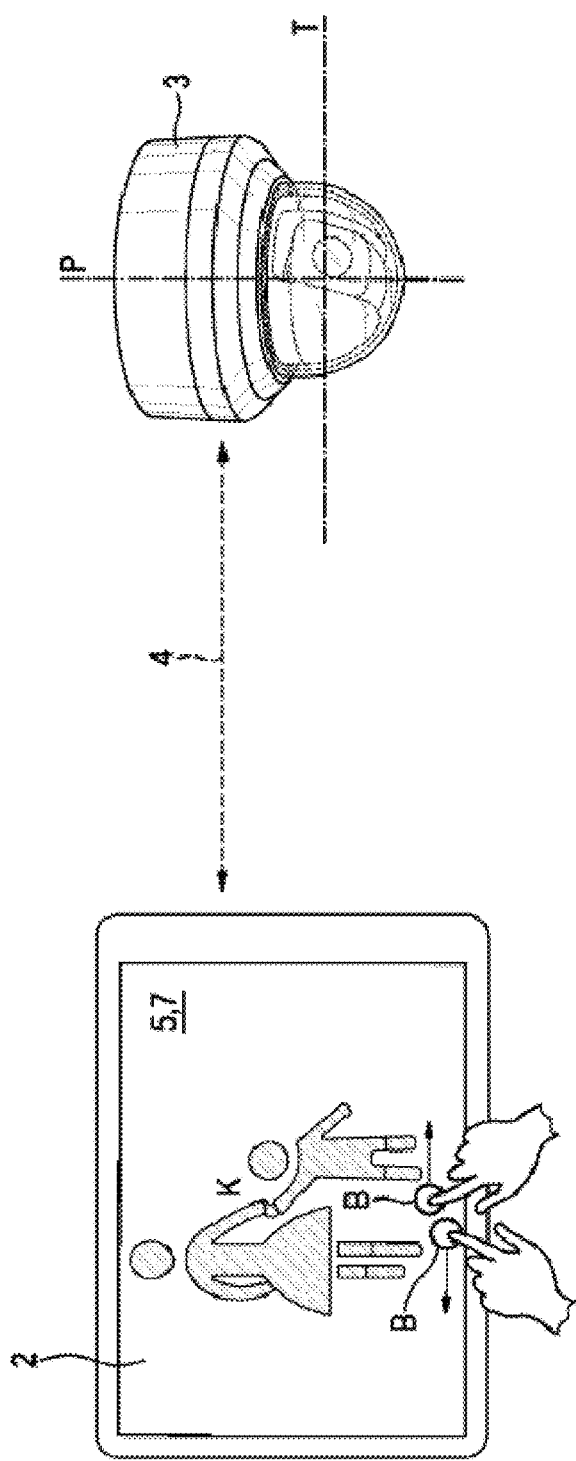
FIG. 2 shows the monitoring system in FIG. 1 in an objective form.

The monitoring system 1 is again objectively depicted in FIG. 2, wherein it can be seen that the PTZ camera 3 can be moved about a tilt axis T that extends horizontally in the depiction and about a vertically extending pan axis P. The PTZ camera 3 can also be mounted in other positions, so that the tilt axis T is then parallel to a mounting plane and the pan axis P is perpendicular to the mounting plane.

The client device 2 is designed as a smartphone, wherein a camera image K of the PTZ camera 3 is displayed on the screen 5. The operation of the selection device 7 is represented graphically which—as described above—is jointly configured with the screen 5 as a touch screen, wherein two different pixels B are selected using two fingers and are displaced on the screen 5 in order to execute a user input.

Figure 3:
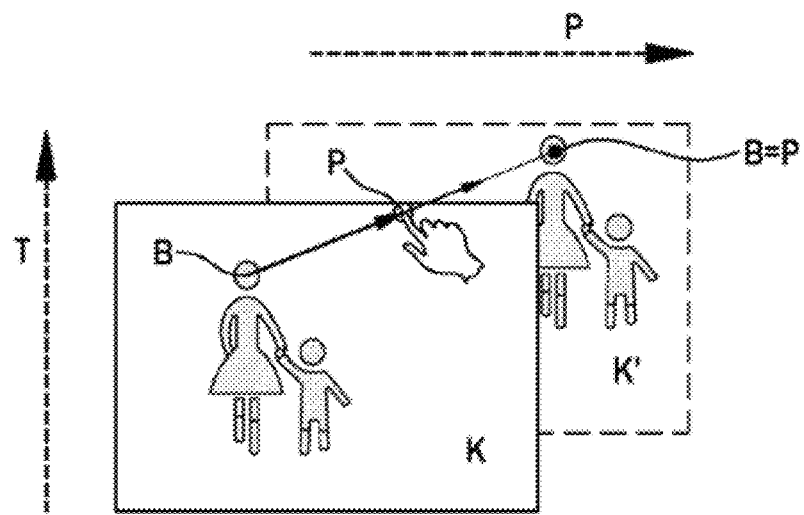
FIG. 3 shows a first schematic depiction for illustrating the functional principle of the client device of the preceding figures.

With the aid of FIG. 3, the functional principle of the monitoring system 1 is to be explained. The monitoring system 1, in particular the client device 2, is designed to control the PTZ camera by means of a user input in the selection device in order to change the camera image K on the screen 5 in an operator friendly and convenient manner. The interactive control of the PTZ camera 3 with respect to the pan axis P and the tilt axis T takes place by a pixel B being selected on the camera image K and being displaced by means of a sliding movement on the selection device, which is embodied as a touchscreen, to a position P. The PTZ camera is subsequently oriented such that the pixel B lies at the selected position P in a succeeding camera image K', as shown in the camera image K'.

Figure 4:
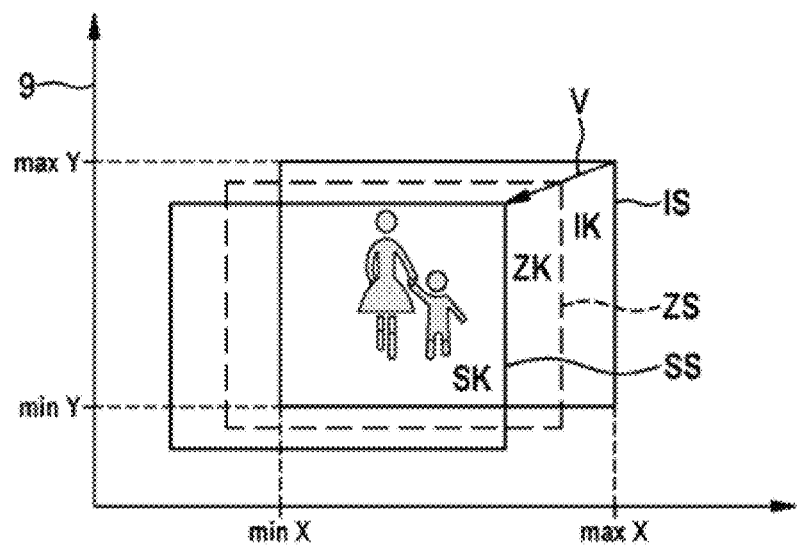
FIG. 4 shows a reference system to further illustrate the functional principle.

The processes taking place in the background are illustrated in detail with the aid of FIG. 4. The image 4 shows a reference system 9 which is designed as a coordinate system and in which all of the pixels that can be captured by the PTZ camera 3 can be displayed. The reference system 9 is designed as a 2D reference system in FIG. 4, wherein the pixels which can be captured by the PTZ camera 3 are projected onto a 2D surface.

An actual camera visual range IS is depicted in the reference system 9, said visual range being defined in the reference system 9 by specifying two corner points and thus the coordinates (min X; min Y); (max X; max Y). From a physical point of view, the actual camera visual range IS is defined by specifying the swivel angle p about the swivel axis P, the tilt angle t about the tilt axis T and a zoom axis Z as well as the intrinsic camera parameters, such as focal width of the PTZ camera 3 etc.

A spherical coordinate system or a 3D reference system can also be selected as the reference system 9 instead of a Cartesian coordinate system, the reference system 9 forming, for example, a hemisphere, wherein the corner points of the camera visual range (for example, an actual camera visual range IS, an intermediate camera visual range ZS, and a desired camera visual range SS) are defined by angular coordinates, in particular by specifying the swivel angle p and the tilt angle t. The selection of the reference system 9 as a 3D reference system is mathematically more complicated; however changes due to the viewing angle can also be displayed in a more realistic manner by projecting the camera images K into the reference system.

During an interaction, such as that depicted in FIG. 3, the actual camera visual range IS is displaced by a displacement vector V to a desired camera visual range SS. The displacement vector V is identical, however oppositely directed, to the vector between the pixel B and the desired position P. The desired camera visual range has other corner coordinates in the reference system 9 and is also associated with other camera parameters, so that particularly the swivel angle p and the angle of inclination t of the PTZ camera 3 are formed differently.

An actual camera image IK is displayed in the actual camera visual range IS. After swiveling and tilting of the PTZ camera 3 as well as transmitting a current image, a desired camera image SK is displayed in the actual camera visual range SS.

Figure 5:
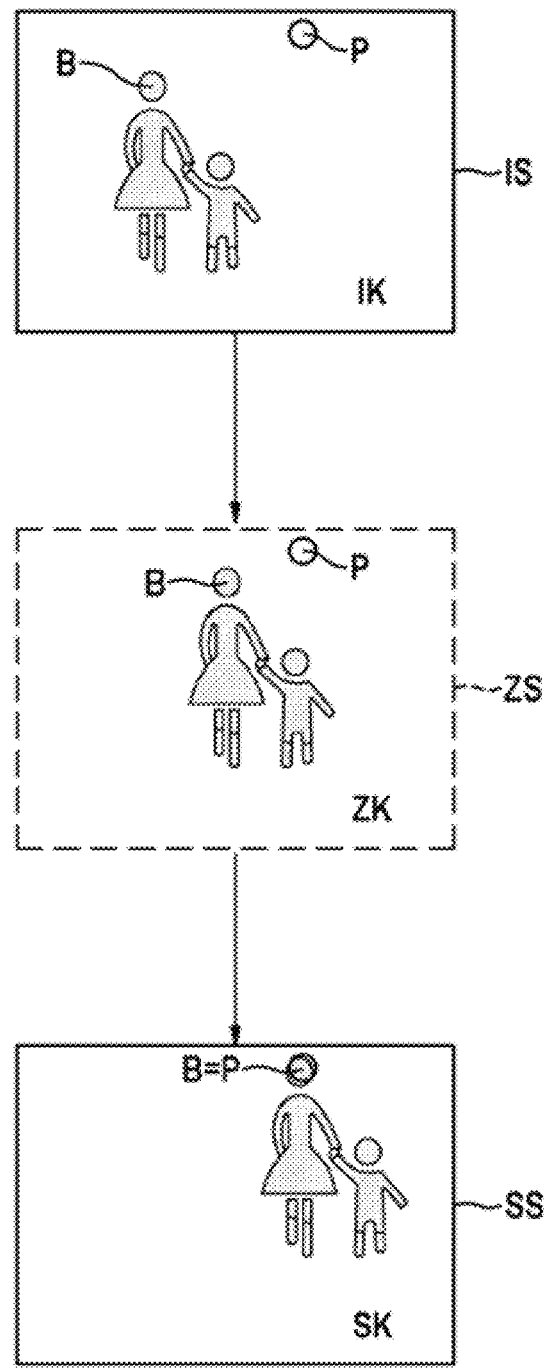
FIG. 5 shows a sequence of image representations which represent the prior art.

From a realistic point of view, the PTZ camera 3 however requires a certain amount of time in order to reset the swivel angle p, the tilt angle t as well as, if applicable, the zoom factor Z. For this reason, it is probable that intermediate camera images ZK are transmitted in the intervening time, said intermediate camera images ZK being disposed in an intermediate camera visual range ZS in the reference system 9. If the three aforementioned camera images: actual camera image IK, intermediate camera image ZK and desired camera image SK are now consecutively displayed on the screen 5, a display would then result such as that in FIG. 5. If the user moved the pixel B to the position P, there is initially no change in the actual camera image IK. In the next camera image, the PTZ camera has already been drawn along so that the intermediate image ZK results, wherein the pixel B and the position P are spaced apart at a smaller distance than in the actual camera image IK, are however not congruent. The pixel B and the position P are only congruent in the desired camera image SK. Due to the latency, this display feels "viscous" for a user of the client device 2 until the pixel B is drawn along to the desired position.

Figure 6:
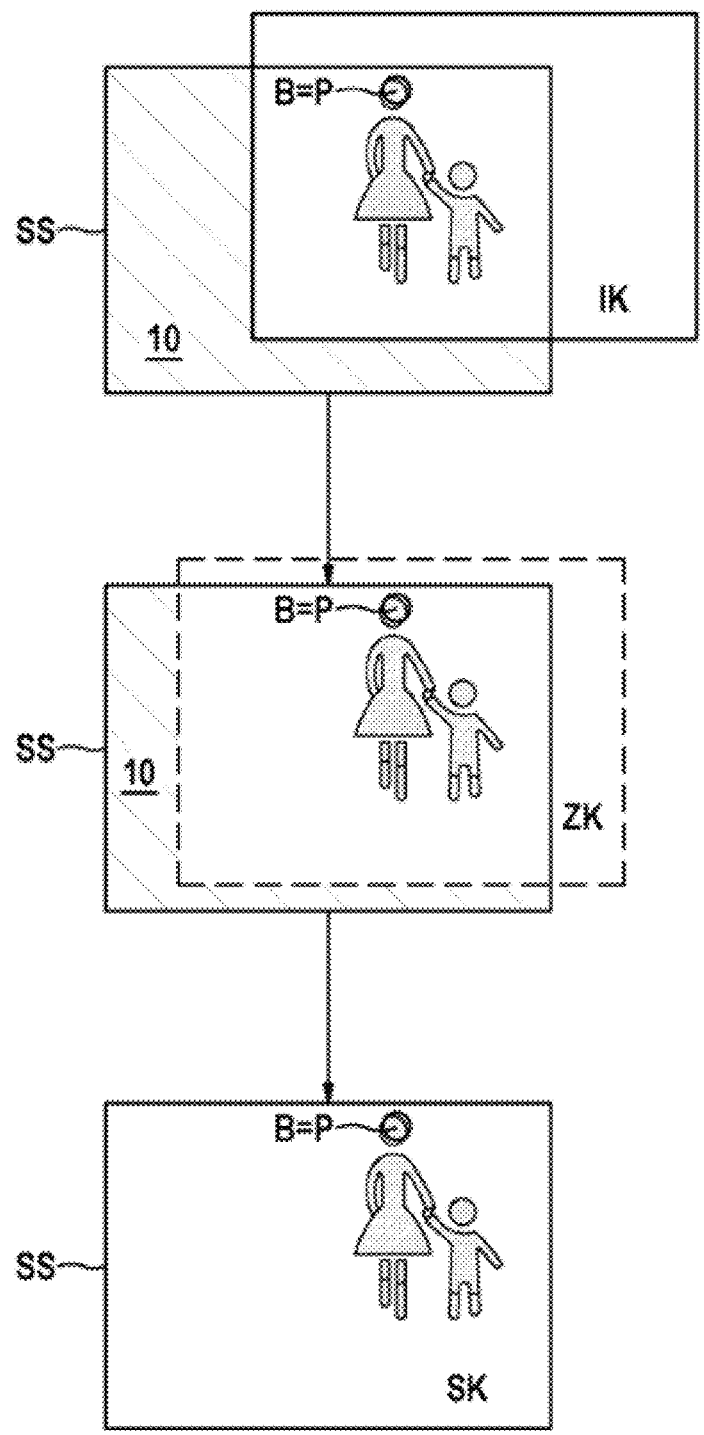
FIG. 6 shows, in the same depiction as in FIG. 5, a sequence of image representations with the monitoring system or, respectively, the client device from the preceding figures.

In order to avoid this latency, the actual camera image and, as the case may be, the intermediate camera image ZK are fit correctly in terms of position and size in the desired camera visual range SS. This behavior is depicted graphically in FIG. 6. By fitting the actual camera image into the desired camera visual range SS, the pixel B and the desired position P are immediately congruent. This congruency is particularly achieved by virtue of the fact that the actual camera image is drawn along with the pixel B. This displacement (and if applicable scaling) of the actual camera image can be performed automatically by the client device 2 and is therefore implemented without delay.

The entire desired camera visual range SS can however not be immediately filled, and thus pixel-free regions 10 remain for which the actual camera image IK does not have any items of image information. The succeeding intermediate camera image ZK is also inserted correctly in terms of position and size into the desired camera visual range SS, so that the pixel-free region 10 is reduced. As soon as the PTZ camera 3 has achieved the camera parameters defined by the desired camera visual range: swivel angle p, angle of inclination t and zoom factor Z, the desired camera visual range SS is completely filled by the desired camera image SK.

It is important to stress that the desired camera visual range SS is always to be displayed on the screen 5. The client device 2 therefore appears to react without any or almost any delay when manipulated by the user via the selection device 7, wherein current items of image information for regions in the desired camera visual range SS that are not congruent with the actual camera range IS are successively loaded.

If FIG. 1 is examined again, it can be seen that request data A are transmitted to the PTZ camera 3 when selecting a desired camera visual range. The request data A can particularly relate to the coordinates of the desired camera visual range SS, the vector between the pixel B and the position P or even to the specification of the desired swivel angle p, angle of inclination t and zoom factor Z. The PTZ camera 3 delivers the camera images, in particular the actual camera image IK, the intermediate camera image ZK and the desired camera image SK, wherein metadata M with respect to each camera image K are however jointly transmitted, said data facilitating an identification of the position of the camera images K in the desired camera visual range; thus enabling the camera images K to be inserted correctly in terms of position and size into the desired camera visual range.

Figure 7:
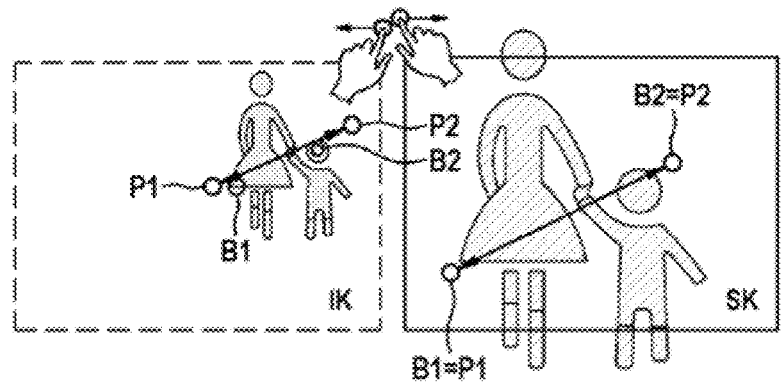
FIG. 7 shows an illustration with regard to the mode of operation of the monitoring system or, respectively, the client device during a zooming operation.

FIG. 7 schematically depicts the mode of operation of the client device 2 during a zoom operation by means of pulling apart two pixels B1, B2 on the actual camera image onto the positions P1, P2 ("pinching"). By pulling apart the pixels B1 and B2 onto the positions P1 and P2, a zoom factor or magnification factor Z is determined.

Figure 8:
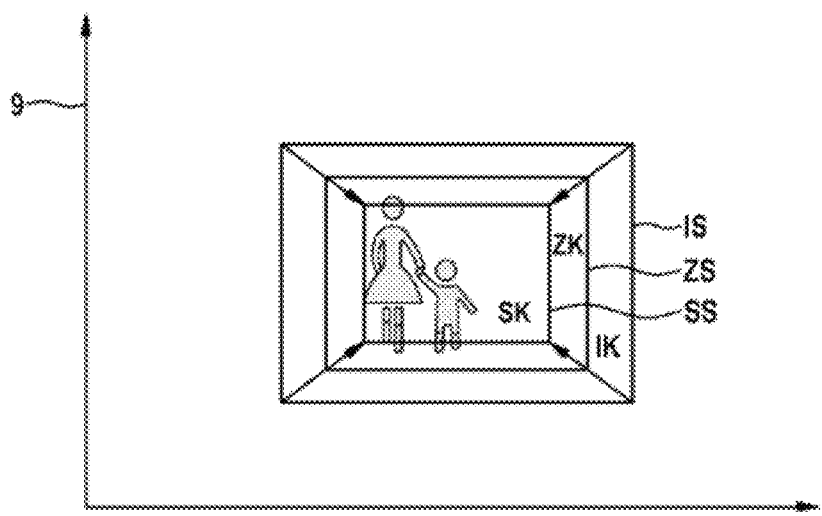
FIG. 8 shows the reference system in FIG. 4 for the purpose of illustrating the mode of operation of zooming.

If the reference system 9 in FIG. 8 is examined again, a magnification of an image section represents a reduction of the desired camera visual range ZS in relation to the actual camera visual range IS, wherein the intermediate camera visual range ZS again assumes an intermediate size. When zooming as a user interaction, the actual camera image is again fit correctly in terms of position and size into the desired camera visual range SS; thus enabling an undelayed reaction of the client device 2 to take place.

The behavior of the client device 2 is particularly characterized in that a selected pixel B, B1, B2 always stays under the "finger" of the user because said pixel always remains congruent with the desired position P as a result of the actual camera image IK being fit into the desired camera visual range SS.

The invention claimed is:

1. A client device for displaying camera images of a controllable camera, said client device comprising:
   a screen,
   a control device that displays a first image representation on the screen, said first image representation showing an actual image in an actual visual range of the camera,
   a selection device that selects a desired visual range of the camera, and
   a communications device that requests and receives a desired image in the desired visual range,
   wherein the control device
      displays a second image representation, the second image representation being an intermediate image captured during a movement of the controllable camera, the intermediate camera image including at least some portion of the actual image fit correctly in terms of position and size within the desired visual range and a pixel-free region,
      displays an additional image representation, the additional image representation showing the desired image fit correctly in terms of position and size within the desired visual range,
   wherein the pixel-free region is a blank region representing a region of the desired visual range in which the actual image does not have image information congruent to the desired visual range,
   wherein the pixel-free region is reduced in size as the desired visual range is filled in as updated image information congruent to the desired visual range is loaded from the controllable camera, and wherein the communications device receives (a) the actual image together with metadata associated with the actual image, (b) the desired image together with metadata associated with the desired image, or (c) both the actual image together with metadata associated with the actual image and the desired image together with metadata associated with the desired image, wherein the metadata facilitate an integration of the camera images into a common reference system.

2. The client device according to claim 1, wherein the control device displays the intermediate image in an intermediate visual range of the camera fit correctly in terms of position and size within the desired visual range in at least one intermediate image representation prior to the additional image representation.

3. The client device according to claim 1, wherein the selection device implements the selection of the desired visual range by interactively moving a selected pixel of the actual image, wherein the actual image is displaced jointly with the selected pixel in order to display at least some portion of the actual image in the desired visual range.

4. The client device according to claim 1, wherein the selection device implements the desired visual range by interactively moving two selected pixels of the actual image, wherein the actual image is scaled as a function of the position of the two selected pixels in order to display at least some portion of the actual image in the desired visual range.

5. The client device according to claim 3, wherein the selected pixel of the actual image is disposed in the desired visual range at the position selected by means of the selection device.

6. The client device according to claim 1, wherein the selection device is designed as a touchscreen.

7. The client device according to claim 1, wherein the metadata are designed as links to the associated camera visual selection or as position specifications in the common reference system.

8. The client device according to claim 1, wherein the common reference system is designed as a 2D reference system.

9. The client device according to claim 1, wherein the common reference system is designed as a 3D reference system or as a spherical coordinate system.

10. A method for displaying camera images on a screen with a client device, the method comprising:
   displaying a first image representation on the screen, the first image representation showing an actual image in an actual visual range of a camera,
   selecting a desired visual range of the camera,
   displaying a second image representation on the screen, the second image representation being an intermediate camera image captured during a movement of the controllable camera, the intermediate camera image including at least some portion of the actual image fit correctly in terms of position and size within the desired visual range and a pixel-free region, and
   displaying an additional image representation on the screen, the additional image representation showing a desired image of the desired visual range fit correctly in terms of position and size within the desired visual range,
   wherein the pixel-free region is a blank region representing a region of the desired visual range in which the actual image does not have image information congruent to the desired visual range,
   wherein the pixel-free region is reduced in size as the desired visual range is filled in as updated image information congruent to the desired visual range is loaded from the camera, and
   wherein the communications device receives (a) the actual image together with metadata associated with the actual image, (b) the desired image together with metadata associated with the desired image, or (c) both the actual image together with metadata associated with the actual image and the desired image together with metadata associated with the desired image, wherein the metadata facilitate an integration of the camera images into a common reference system.

11. A non-transitory machine-readable storage medium having a computer program stored thereon having program code for carrying out, on a computer connected to a screen, all of the steps of:
   displaying a first image representation on the screen, the first image representation showing an actual image in an actual visual range of a camera,
   selecting a desired visual range of the camera,
   displaying a second image representation on the screen, the second image representation being an intermediate camera image captured during a movement of the controllable camera, the intermediate camera image including at least some portion of the actual image fit correctly in terms of position and size within the desired visual range and a pixel-free region, and
   displaying an additional image representation on the screen, the additional image representation showing a desired image of the desired visual range fit correctly in terms of position and size within the desired visual range,
   wherein the pixel-free region is a blank region representing a region of the desired visual range in which the actual image does not have image information congruent to the desired visual range,
   wherein the pixel-free region is reduced in size as the desired visual range is filled in as updated image information congruent to the desired visual range is loaded from the camera, and
   wherein the communications device receives (a) the actual image together with metadata associated with the actual image, (b) the desired image together with metadata associated with the desired image, or (c) both the actual image together with metadata associated with the actual image and the desired image together with metadata associated with the desired image, wherein the metadata facilitate an integration of the camera images into a common reference system.

12. A monitoring system comprising the client device according to claim 1, and further comprising the controllable camera.

13. The monitoring system according to claim 12, wherein a transition from the actual visual range to the desired visual range corresponds to the movement of the controllable camera, the movement resulting from at least one selected from the group consisting of a change in an orientation of the camera and a change in a zoom setting of the camera.

14. The client device according to claim 1, wherein the selection device implements the selection of the desired visual range by interactively moving a selected pixel of the actual image to a desired position, wherein the actual image remains congruent to the selected pixel while the selected pixel is moved to the desired position.

15. The client device according to claim 1, wherein the control device displays the intermediate image representation prior to the additional image representation, the intermediate image representation showing an intermediate image fit correctly in terms of position and size within the desired visual range and the pixel-free region.

16. The client device according to claim 1, wherein the metadata facilitates an identification of a position of the actual image, the desired image, or both the actual image and the desired image in the desired visual range for integrating the actual image, the desired image, or both the actual image and the desired image correctly in terms of position and size into the desired visual range.

17. The client device according to claim 1, wherein a first region in the actual image of the second image representation and a second region in the desired image of the additional image representation congruently overlap on the screen, wherein the first region and the second region are stationary and substantively identical.

18. The client device according to claim 1, wherein the at least a portion of the actual image of second image representation and the desired image of the additional image representation are sequentially integrated into the desired visual range.

* * * * *